Patented May 11, 1926.

1,583,901

UNITED STATES PATENT OFFICE.

HARRY GEORGE SCHURECHT, OF PITTSBURGH, PENNSYLVANIA, ASSIGNOR OF ONE-HALF TO HENRY THOMAS SHELLEY, TRUSTEE, OF PHILADELPHIA, PENNSYLVANIA, AND ONE-HALF TO GEORGE CASPER DOERING LENTH, TRUSTEE, OF CHICAGO, ILLINOIS.

SALT GLAZING.

No Drawing. Application filed July 23, 1924. Serial No. 727,715.

This invention relates to salt or vapor-glazing of ceramic ware. This method of glazing, as commonly employed consists in introducing common salt, sodium chloride, into the kiln or furnace containing the ware, during the later stages of the burn, either by throwing it upon the fires or introducing it directly into the kiln; and the salt, which is thereby volatilized and probably dissociated, combines with the body of the ware to form a glaze on its surface. This method of glazing is applicable over a wide range of ceramic manufacturing processes including the production of sewer pipe, stoneware, brick, wall coping, silo block, etc.

It is the common experience of manufacturers of such ware that a certain proportion of their product comes out of the kiln poorly glazed, the glaze in many instances being thin and dull and the ware having a dry appearance. It is the object of the present invention to improve the quality of the glaze and to reduce the proportion of imperfectly glazed ware.

I have discovered that a much improved glaze results if a volatile material containing zinc, such as zinc chloride, is added to the salt or introduced into the kiln simultaneously therewith, and that the addition of small quantities of water and combustible carbonaceous materials, such as powdered coal, lamp black or oil, also improve the glaze. Quantitatively I prefer to add the above named materials in amounts of approximately 1 to 20% based on the weight of salt.

I have obtained improved glazes by the use of the following mixtures introduced into the kiln when the temperature of the latter is about 1100° C.

|  |  | Parts. |
|---|---|---|
| I. | Sodium chloride | 100 |
|  | Zinc chloride | 2 |
| II. | Sodium chloride | 100 |
|  | Zinc chloride | 2 |
|  | Water | 5 |
| III. | Sodium chloride | 100 |
|  | Zinc chloride | 2 |
|  | Powdered coal, lampblack or oil | 5 |
| IV. | Sodium chloride | 100 |
|  | Zinc chloride | 2 |
|  | Powdered coal, lampblack or oil | 5 |
|  | Water | 5 |

The glazes which result from the use of these mixtures are brighter and thicker than the ordinary salt glaze and the proportion of poorly glazed ware is much less. Other volatile materials containing zinc can also be used, as for example zinc oxide and metallic zinc.

Although the salt commonly used in salt glazing is sodium chloride and is the salt which I have indicated as the base of the glazing compositions referred to in this specification, I have found that chlorides of other alkali metals such as potassium chloride and lithium chloride are also suitable and may be substituted either in whole or in part for the sodium salt. I am claiming the use of these other alkali metal chlorides in a copending application Serial No. 727,716 filed concurrently herewith. The term alkali metal chloride, as used in the following claims, is therefore to be construed as covering chlorides of these three common alkali metals.

I claim:

1. A salt-glazing composition comprising an alkali metal chloride and approximately 1 to 20% of a volatile material containing zinc.

2. A salt-glazing composition comprising an alkali metal chloride, approximately 1 to 20% of a volatile material containing zinc and approximately 1 to 10% of water.

3. A salt-glazing composition comprising an alkali metal chloride, approximately 1 to 20% of a volatile material containing zinc and approximately 1 to 20% of a combustible carbonaceous material.

4. A salt-glazing composition comprising an alkali metal chloride, approximately 1 to 20% of a volatile material containing zinc, approximately 1 to 20% of a combustible carbonaceous material and approximately 1 to 15% of water.

4. A salt-glazing composition comprising sodium chloride and approximately 1 to 20% of zinc chloride.

6. A salt-glazing composition comprising sodium chloride, approximately 1 to 20% of zinc chloride and approximately 1 to 15% of water.

7. A salt-glazing composition comprising sodium chloride, approximately 1 to 20% of zinc chloride and approximately 1 to 20% of a combustible carbonaceous material.

8. A salt-glazing composition comprising sodium chloride, approximately 1 to 20% of zinc chloride, approximately 1 to 20% of a combustible carbonaceous material and approximately 1 to 15% of water.

9. The method of salt-glazing ceramic ware which comprises volatilizing an alkali metal chloride and a volatile material containing zinc in a kiln containing the ware during the burning thereof.

10. The method of salt-glazing ceramic ware which comprises volatilizing sodium chloride and zinc chloride in a kiln containing the ware during the burning thereof.

11. The method of salt-glazing ceramic ware which comprises volatilizing a mixture of sodium chloride and approximately 1 to 20% of zinc chloride in a kiln containing the ware during the burning thereof.

12. The method of salt-glazing ceramic ware which comprises volatilizing a mixture of sodium chloride and approximately 1 to 20% of zinc chloride in a kiln containing the ware when the temperature of the kiln is about 1100° C.

13. A salt-glazed ceramic article glazed by volatilizing a mixture of sodium chloride and approximately 1 to 20% of zinc chloride in the kiln during the burning of the ware.

In testimony whereof I affix my signature.

HARRY GEORGE SCHURECHT.